United States Patent
Jurkat et al.

(10) Patent No.: US 7,638,984 B2
(45) Date of Patent: Dec. 29, 2009

(54) METHOD FOR THE OPERATION OF A WIND ENERGY PLANT WITH VOLTAGE-DEPENDENT CONTROL OF A REACTIVE ELECTRIC VARIABLE WHICH IS TO BE PROVIDED

(75) Inventors: Mark Jurkat, Norderstedt (DE); Kay Richter, Norderstedt (DE); Ralf Harder, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 12/102,580

(22) Filed: Apr. 14, 2008

(65) Prior Publication Data

US 2009/0140704 A1     Jun. 4, 2009

(30) Foreign Application Priority Data

Dec. 1, 2007    (DE) .................. 10 2007 057 925

(51) Int. Cl.
*H20P 11/00* (2006.01)
(52) U.S. Cl. .............................. 322/35; 322/36; 322/37
(58) Field of Classification Search .................. 322/35, 322/28, 36, 37
See application file for complete search history.

(56) References Cited

U.S. PATENT DOCUMENTS

| 7,423,412 | B2 * | 9/2008 | Weng et al. ................... 322/20 |
| 7,453,241 | B2 * | 11/2008 | Keiter et al. ................... 322/28 |
| 2007/0233406 | A1 | 10/2007 | Delmerico | |

FOREIGN PATENT DOCUMENTS

| EP | 1 282 774 B1 | 3/2001 |
| EP | 1 386 078 B1 | 4/2002 |
| EP | 1 508 951 A1 | 8/2004 |
| EP | 1 841 037 A2 | 3/2007 |
| FR | 2 894 087 A1 | 1/2001 |
| FR | 2 823 381 A1 | 10/2002 |
| JP | 2000-14011 | 1/2000 |
| WO | 2007060328 A1 | 3/2007 |

OTHER PUBLICATIONS

"Reactive power control of wind farms for voltage control applications" by A Tapia, et al,Renewable Energy, www.elsevier.com; pp. 377-392.

* cited by examiner

*Primary Examiner*—Nicholas Ponomarenko
*Assistant Examiner*—Iraj A Mohandesi
(74) *Attorney, Agent, or Firm*—Vidas, Arrett & Steinkraus, P.A.

(57) ABSTRACT

A method for the operation of a wind energy plant, with control of a reactive electric variable which is to be provided, wherein a desired value for the reactive electric variable is determined as follows: a first upper and/or a first lower limit value of the grid voltage is defined for the grid voltage, when the real value of the grid voltage exceeds the first upper limit value and/or the real value of the grid voltage falls below the first lower limit value, the desired value of the reactive electric variable is increased or diminished such that the deviation of the real value of the grid voltage from its desired value is counter-acted, wherein the desired value of the reactive electric variable is continuously increased or diminished further over the time, as long as the real value of the grid voltage exceeds the first upper limit value or falls below the first lower limit value.

20 Claims, 6 Drawing Sheets

METHOD FOR THE OPERATION OF A WIND ENERGY PLANT WITH VOLTAGE-DEPENDENT CONTROL OF A REACTIVE ELECTRIC VARIABLE WHICH IS TO BE PROVIDED

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the operation of a wind energy plant with voltage-dependent control of a reactive electric variable which is to be provided, in which a desired value for the reactive electric variable is calculated.

Today's wind parks are required to be voltage-supportingly connected with the electric grid. It is therefore provided that a voltage-dependent reactive power is provided by the individual wind energy plants and/or by the wind park as a whole. This is also designated as an Automatic Voltage Regulation (AVR), and it serves to keep the voltage constant in the grid by providing reactive power and/or reactive current at voltage fluctuations which remain in certain ranges.

From EP 1 282 774, the entire contents of which is incorporated herein by reference, a method for the operation of a wind energy plant with a generator is known, which generates electric power for an electric supply grid. In the wind energy plant it is dealt with a pitch-controlled plant, the power of which is controlled and/or adjusted depending on the grid frequency. Further, it is known that the supplied power is reduced when the grid frequency exceeds a reference value for the grid frequency for more than 3%.

From EP 1 386 078, the entire contents of which is incorporated herein by reference, it is known to change the phase angle depending on the absolute value of a voltage detected in the supply grid. In this, the phase angle remains unchanged inside a dead band. When leaving the dead band, the absolute value of the phase angle, which describes the reactive portion of the power, is increased at rising or decreasing voltage.

From EP 1 508 951 A1, the entire contents of which is incorporated herein by reference, it is known to adapt the reactive power which is to be provided dynamically, depending on parameters of the wind energy plant.

The present invention is based on the objective to provide a method for the operation of a wind energy plant, in which can be reacted to voltage changes by providing a reactive electric variable in a time which is as short as possible.

BRIEF SUMMARY OF THE INVENTION

The invention is related to a method for the operation of a wind energy plant with voltage-dependent control of a reactive electric variable which is to be provided. In the method of the invention, a desired value for the reactive electric variable is calculated. In doing so, the method of the invention presumes that a first upper and/or a first lower limit value of the grid voltage is defined for the grid voltage. Thus, according to the invention, three variants of the method of the invention are embraced, which are related to the case that (first) only a first upper limit value, (second) only a first lower limit value and (third) a first upper limit value as well as a first lower limit value are defined. The method of the invention provides that when the real value of the grid voltage exceeds the first upper limit value, the desired value of the reactive electric variable is increased or diminished such that the deviation of the real value of the grid voltage from its desired value is counteracted. Also, in the variants two and three, the method of the invention provides that when falling below the first lower limit value, the desired value of the reactive electric variable is increased or diminished such that the deviation of the real value of the grid voltage from its desired value is counteracted. According to the invention, the desired value of the reactive electric variable is continuously increased or diminished further over the time, as long as the real value of the grid voltage exceeds the first upper limit value or falls below the first lower limit value. Thus, in the method of the invention, a change of the desired value of the reactive electric variable continuous over the time is initiated when the first upper limit value is exceeded and/or the first lower limit value is underrun. This change continues as long as the real values of the grid voltage are above or below the first upper limit value or the first lower limit value, respectively.

In the context of the provision of reactive power, different expressions are used in the art:

For instance, it may be spoken of the provision of capacitive or inductive reactive power, the supply or the withdrawal of reactive power or of an over-excited and an under-excited operation. In the following, if not mentioned otherwise expressively, it is always spoken of a voltage-increasing reactive power or of a voltage-decreasing reactive power, respectively. In the consideration of wind energy plants on the grid, different algebraic sign conventions have also been established in the context of reactive electric variables, let it be electric reactive power or the electric reactive current. In the following, a positive sign is used for voltage-increasing reactive power and a negative sign for voltage-decreasing reactive power.

In a preferred extension of the method of the invention, the first upper limit value of the grid voltage is greater than the desired value or equal to the desired value for the grid voltage. Also, the first lower limit value of the grid voltage is smaller than the desired value or equal to the desired value of the grid voltage. Thus, first upper and lower limit values are preferably above and below the desired value for the grid voltage, respectively.

In a preferred embodiment, the desired value of the reactive electric variable is increased or diminished until the desired value has reached a maximum value or a minimum value. In this preferred embodiment, the change of the desired value for the reactive electric variable is stopped when the desired value has reached a predetermined maximum or minimum value. The advantage of this limitation is that when the wind energy cannot develop a grid-supporting function, from on a certain provided maximum or minimum value, further increase or lowering of the reactive electric variable is interrupted.

In a preferred embodiment, a second lower limit value is defined in addition, which is smaller or equal to the first upper limit value. When the real value of the voltage falls below the second lower limit value, the desired value for the reactive electric variable is continuously increased or diminished over the time, for so long until a first predetermined desired value for the reactive electric variable has been reached. In analogy to this, a second upper limit value is also preferably defined, which is greater or equal to the first lower limit value, wherein when the real value of the voltage exceeds the second upper limit value, the desired value of the reactive electric variable is continuously increased or diminished over the time, for so long until a second predetermined desired value for the reactive electric variable has been reached. The additional second upper and lower limit values permit to define a voltage range in which increasing and lowering to predetermined desired values for the reactive electric variable are possible, respectively. In a preferred embodiment, the predetermined desired values for the first and the second reactive electric variable are equal, particularly preferred both desired values have the value zero. Thus, in this embodiment, the desired value for the reactive electric variable is set back to the value zero when the second lower limit value was under-run. By the introduction of the second upper and lower limit value, an at least partially continuous control can be exerted.

In a preferred embodiment, the desired value for the reactive electric variable is set to a value which is constant over time when the real value of the grid voltage falls below the first upper limit value again, and/or exceeds the first lower limit value again. In this, the value which is constant over time for the reactive electric variable is preferably equal to the actual desired value of the reactive electric variable in the point of time when the same exceeds the first lower limit value again or falls below the first upper limit value again, respectively. Thus, in this embodiment, when the real value of the grid voltage enters again into the range defined by the first upper limit value and the first lower limit value, the desired value for the reactive electric variable is kept constant at its actual value. In analogy to the embodiment of the method of the invention described above, in which the value which is constant over time is provided for the reactive variable, it may also be provided that when the real value of the grid voltage exceeds the second lower limit value again, and/or falls below the second upper limit value again, the desired value for the reactive electric variable is set to a value which is constant over time. In doing so, the value constant over time can be preferably the actual desired value of the reactive electric variable again.

In a preferred embodiment of the method of the invention, the second upper limit value of the grid voltage is smaller or equal to the first upper limit value of the grid voltage. Also, the second lower limit value of the grid voltage is preferably greater or equal to the first lower limit value of the grid voltage.

For those skilled in the art, it is commonly known that there are plural possibilities of the representation of reactive electric variables: reactive power, reactive current, phase angle or power factor.

Also, it is commonly known to those skilled in the art that for providing and influencing a reactive electric variable, control of the generator and/or the converter system and/or the phase shifter system can be applied.

In a preferred embodiment of the method of the invention, the limit values can be set with respect to the desired value for the grid voltage.

BRIEF DESCRIPTION OF THE SEVERAL VIEWS OF THE DRAWINGS

The method of the invention will be explained in more detail by means of an example in the following.

DETAILED DESCRIPTION OF THE INVENTION

Figure 1:
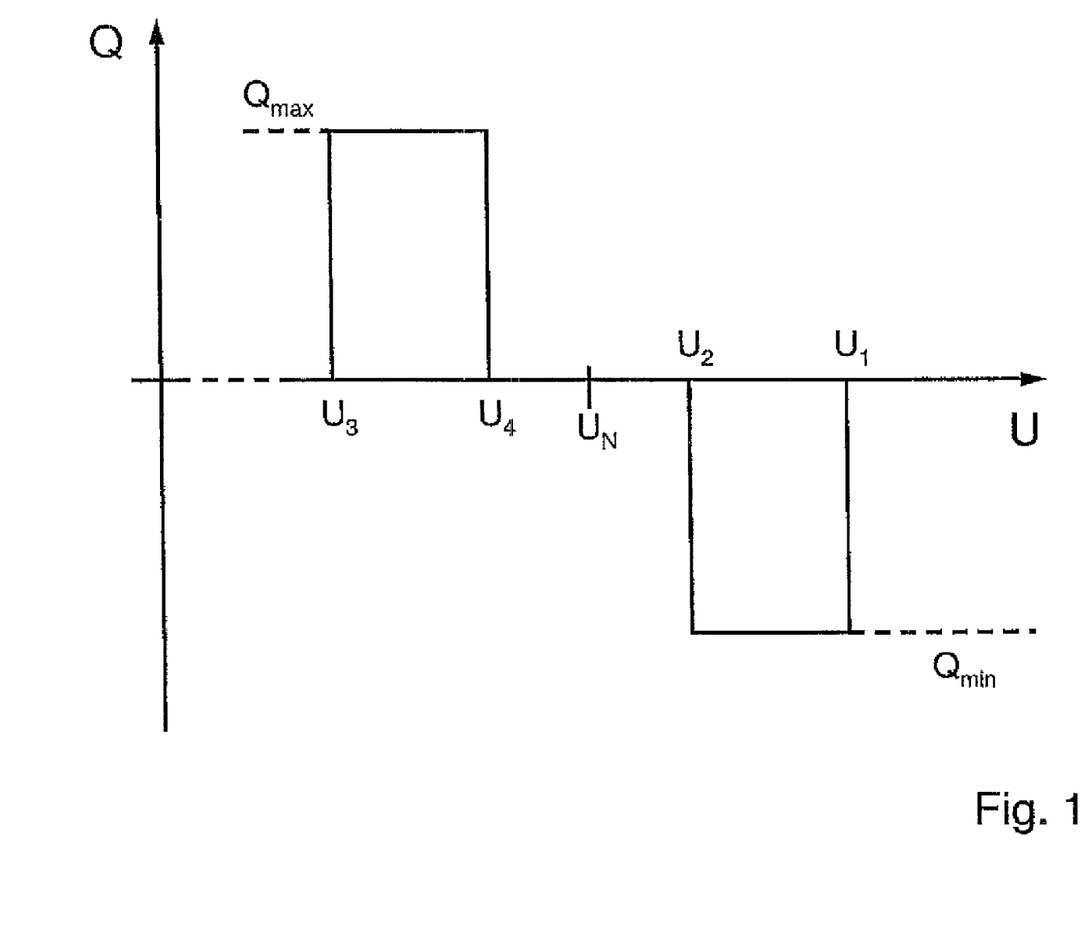
FIG. 1 shows a depiction of the determination of the desired value for the reactive power depending on the measured voltage.

While this invention may be embodied in many different forms, there are described in detail herein a specific preferred embodiment of the invention. This description is an exemplification of the principles of the invention and is not intended to limit the invention to the particular embodiment illustrated FIG. 1 shows the values for the grid voltage U on the abscissa, wherein $U_N$ indicates a desired value for the grid voltage. Along the ordinate, values for the reactive power Q are plotted, wherein a voltage-increasing reactive power is plotted above the abscissa, and a voltage-decreasing reactive power below the abscissa.

When the grid voltage increases, the control method of the invention does not intervene and it does not change the actual desired value for the reactive power until the first upper limit value $U_1$ is reached. Only when the limit value $U_1$ is exceeded, lowering of the desired value for the reactive power takes place, i.e. voltage-decreasing reactive power is provided. The desired value for the reactive power is subsequently lowered further and further over time for so long until either a limit value of the reactive power $Q_{min}$ is reached or until the limit value of the voltage $U_1$ is under-run again. Thus, the desired value of the reactive power is lowered further and further from on the point of time in which the limit value $U_1$ was exceeded, corresponding to the duration of the transgression of the limit value $U_1$, wherein for instance, the lowering of the desired value can take place in a constant amount per unit time: $dQ/dt=const$. When a limit value of the reactive power $Q_{min}$ is reached, the desired value for the reactive power is kept constant on that value from on this point of time, as indicated in FIG. 1 through the dashed portion at $Q_{min}$.

When the grid voltage falls below the limit value $U_1$ again, the desired value for the reactive power is kept constant again, namely on the desired value reached up to this point of time.

Only when the grid voltage falls even below the second lower limit value $U_2$, the desired value for the reactive power is increased again, namely from on the point of time of under-running the limit value $U_2$, corresponding to the duration of under-running the limit value $U_2$. The desired value for the reactive power is further increased for so long until a predetermined reactive power desired value, zero for instance, has been reached or until the limit value $U_2$ has been exceeded again through a new increase of the grid voltage. Thereafter, the reactive power desired value is kept constant again, namely on the desired value reached up to this point of time.

When the grid voltage drops down, the control method of the invention does not intervene and it does not change the actual desired value for the reactive power until the first lower limit value $U_3$ is reached. Only when the limit value $U_3$ is under-run, increase of the desired value for the reactive power takes place, i.e. voltage-increasing reactive power is provided. The desired value for the reactive power is subsequently increased further and further over time for so long until either a limit value of the reactive power $Q_{max}$ is reached or until the limit value of the voltage $U_3$ is exceeded again. Thus, the desired value of the reactive power is increased farther and further from on the point of time in which the limit value $U_3$ was under-run, corresponding to the duration of falling below the limit value $U_3$, wherein for instance, the increase of the desired value can take place in a constant amount per unit time: $dQ/dt=\text{const}$. When a limit value of the reactive power $Q_{max}$ is reached, the desired value for the reactive power is kept constant on that value from on this point of time, as indicated in FIG. 1 through the dashed portion at $Q_{max}$.

When the grid voltage exceeds the limit value $U_3$ again, the desired value for the reactive power is kept constant again, namely on the desired value reached up to this point of time.

Only when the grid voltage exceeds even the second upper limit value $U_4$, the desired value for the reactive power is lowered again, namely from on the point of time of the transgression of the limit value $U_4$, corresponding to the duration of the transgression of the limit value $U_4$. The desired value for the reactive power is further lowered for so long until a predetermined reactive power desired value, zero for instance, has been reached or until the limit value $U_4$ has been under-run again through a new drop of the grid voltage. Thereafter, the reactive power desired value is kept constant again, namely on the desired value reached up to this point of time.

Figure 2:
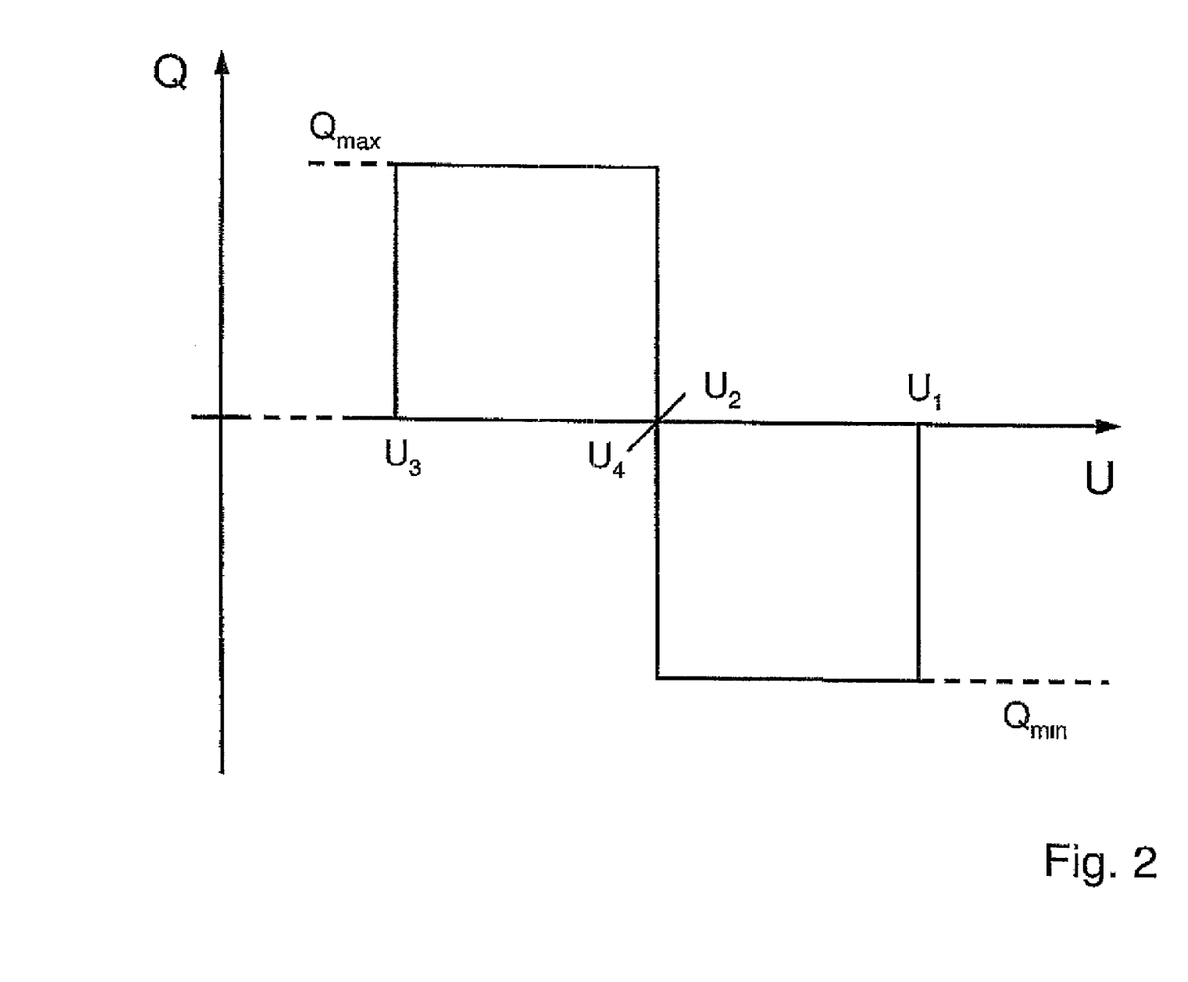
FIG. 2 shows a depiction of an alternative determination of the desired value for the reactive power depending on the measured voltage.

FIG. 2 shows an alternative embodiment of the method, wherein the limit values $U_2$ and $U_4$ are equal. The position of the desired value rated voltage $U_N$ is not indicated here, it may be situated in the interval between $U_3$ and $U_1$ at any position and has not to coincide with $U_2$ or $U_4$, respectively.

Presumed a desired value of the reactive power is set below the abscissa (=voltage decreasing reactive power) and the grid voltage coming from the interval between $U_2$ and $U_1$ drops below the limit value $U_2$, the desired value of the reactive power is increased until the preset value (zero for instance) is reached, and then it is kept constant at this preset value. Only when the limit value $U_3$ was under-run in a further drop of the grid voltage, the desired value of the reactive power is increased further.

In the reverse case that a desired value of the reactive power above the abscissa is set (=voltage-increasing reactive power), and the grid voltage coming from the interval between $U_3$ and $U_4$ increases further above $U_4$, the desired value of the reactive power is correspondingly decreased at first, until the preset value (for instance, zero) is reached, and thereafter it is kept constant. Only when the limit value $U_1$ is exceeded in a further rise of the grid voltage, the desired value of the reactive power is lowered further.

Figure 3:
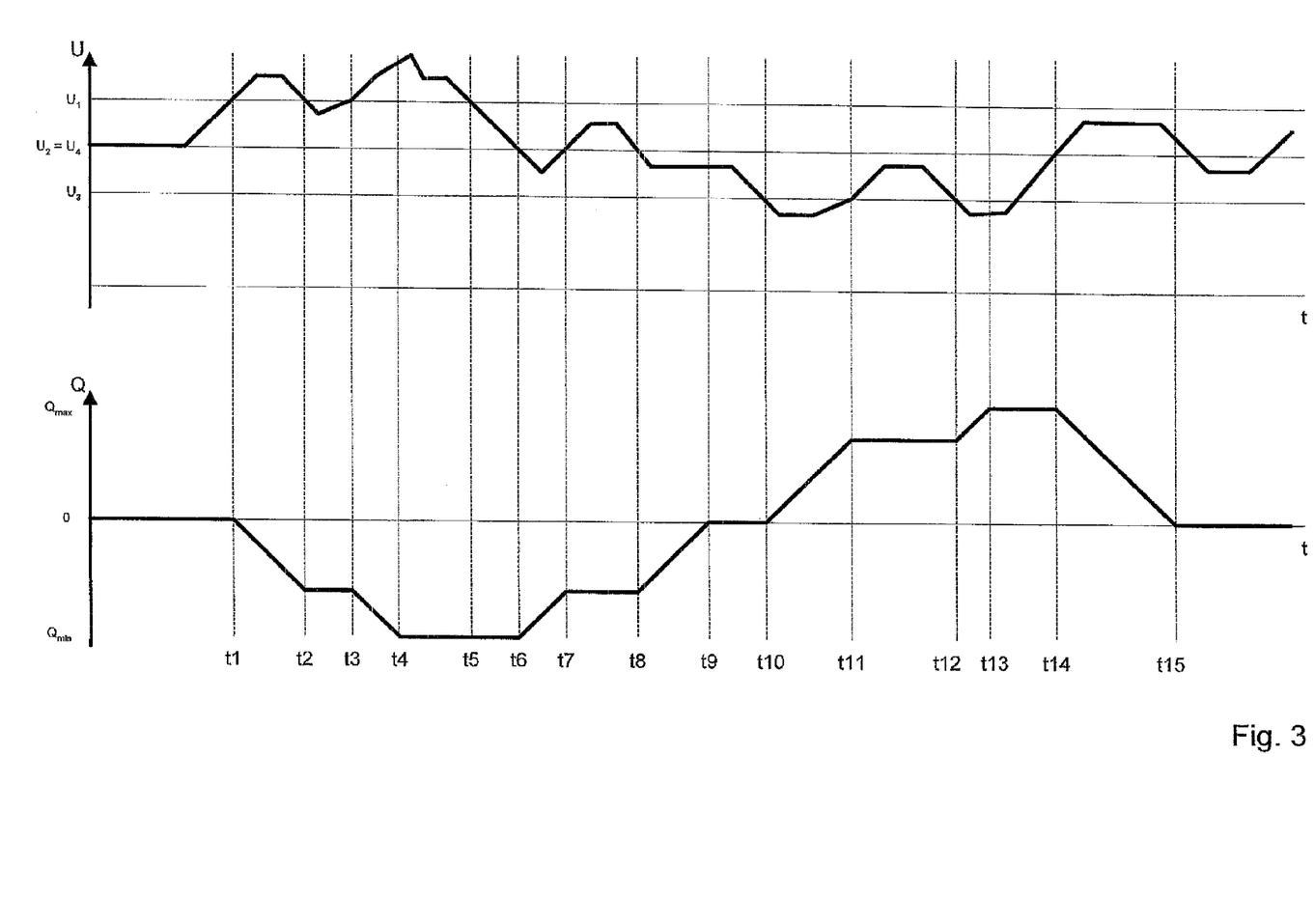
FIG. 3 shows an exemplary course of the voltage and of the desired value of the reactive power over the time.

The concept which was set forth can be simply clarified by means of FIG. 3. The upper part of FIG. 3 shows an exemplary course of the voltage over time. The first upper limit value of the voltage $U_1$, the first lower limit value of the voltage $U_3$ and the second limit values $U_2$ and $U_4$ can be recognised, wherein $U_2=U_4$ was chosen. Thus, this is equivalent to the depiction from FIG. 2.

The lower part of FIG. 3 shows the corresponding course of the desired value of the reactive power Q over time, which results according to the method of the invention. The preset value zero, the upper limit value $Q_{max}$ and the lower limit value $Q_{min}$ can be recognised.

In the time interval between the point of origin and the point of time $t_1$ the voltage increases gradually, and in the point of time $t_1$ it reaches the first upper limit value $U_1$. As can be recognised in the lower part of the diagram in FIG. 3, the desired value of the reactive power remains constantly at the value zero up to the point of time $t_1$. From on the point of time $t_1$ up to $t_2$, the voltage exceeds the first upper limit value $U_1$, and according to the invention, the desired value of the reactive power Q is lowered in the course of time, as long as the voltage exceeds the limit value $U_1$. The linear decrease of the desired value for the reactive power results from the fact that a desired value decrement constant over time is defined, as is depicted in the description for FIG. 1 in the upside. In principle, non-linear forms are possible in the increment and/or decrement of the desired value. For instance, it is also possible to make the change of the desired value proportional to the voltage deviation, $dQ/dt \sim (U_N-U_{ist})$.

In the interval of time from $t_2$ up to $t_3$, the voltage falls below the upper limit value $U_1$, in this interval of time the desired value of the reactive power Q is kept constant at that value which had been reached up to the point of time $t_2$. From on the point of time $t_3$, the voltage exceeds the upper limit value $U_1$ again, and a lowering of the desired value for the reactive power Q constant over time takes place again. In the point of time $t_4$, the limit value of the reactive power $Q_{min}$ is reached, from on this point of time the desired value of the reactive power Q is no more lowered further, but is kept constant on the value $Q_{min}$, even though the voltage still remains above the upper limit value $U_1$ and occasionally even rises still further. In the point of time $t_5$, the voltage falls below the upper limit value $U_1$ again, the desired value of the reactive power is further on kept constant on the value $Q_{min}$ which had been reached up to then. In the point of time $t_6$, the voltage falls below the second lower limit value $U_2$, therefore the desired value of the reactive power Q is raised again over the time. In the point of time $t_7$, the lower limit value $U_2$ is exceeded again, and the desired value of the reactive power Q is kept constant on the value which had been reached up to then. From on the point of time $t_8$, the lower limit value $U_2$ is under-ran again, therefore the desired value of the reactive power is raised further, until the preset value zero has been reached in the point of time $t_9$. From on this point of time, the desired value of the reactive power Q is kept constant on the preset value zero.

From on the point of time too, the voltage falls below the first lower limit value $U_3$, therefore, the desired value of the reactive power Q is increased over the time. From $t_{11}$ up to $t_{12}$, the voltage reverts to the range between the limit values $U_3$ and $U_4$, so that the desired value of the reactive power Q is kept constant in this interval of time, namely on the value which was reached in the point of time $t_{11}$. From on $t_{12}$, the voltage falls below the first lower limit value $U_3$ again, therefore the desired value of the reactive power Q is increased further, until the limit value $Q_{max}$ of the reactive power is reached in the point of time $t_{13}$. From on $t_{13}$, the desired value of the reactive power is kept constant for so long until the upper limit value $U_4$ of the voltage is exceeded again in the point of time $t_{14}$. From on $t_{14}$, the desired value of the reactive power Q is therefore lowered again over the time, and in the point of time $t_{15}$ it reaches the preset value zero, at which it is kept constant from on $t_{15}$ again.

Figure 4:
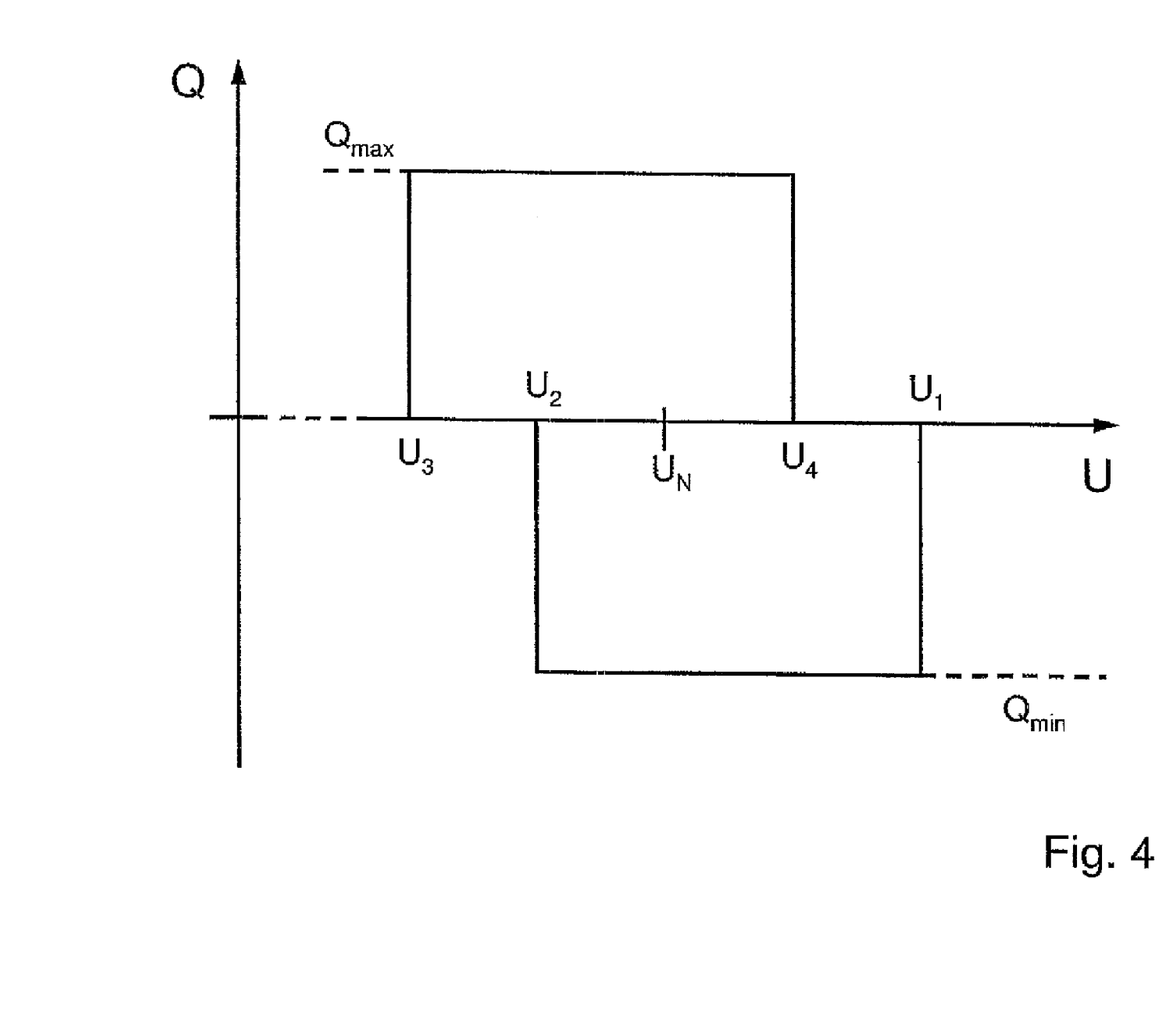
FIGS. 4 and 5 show depictions of further alternative determinations of the desired value for the reactive power depending on the measured voltage.
Figure 5:
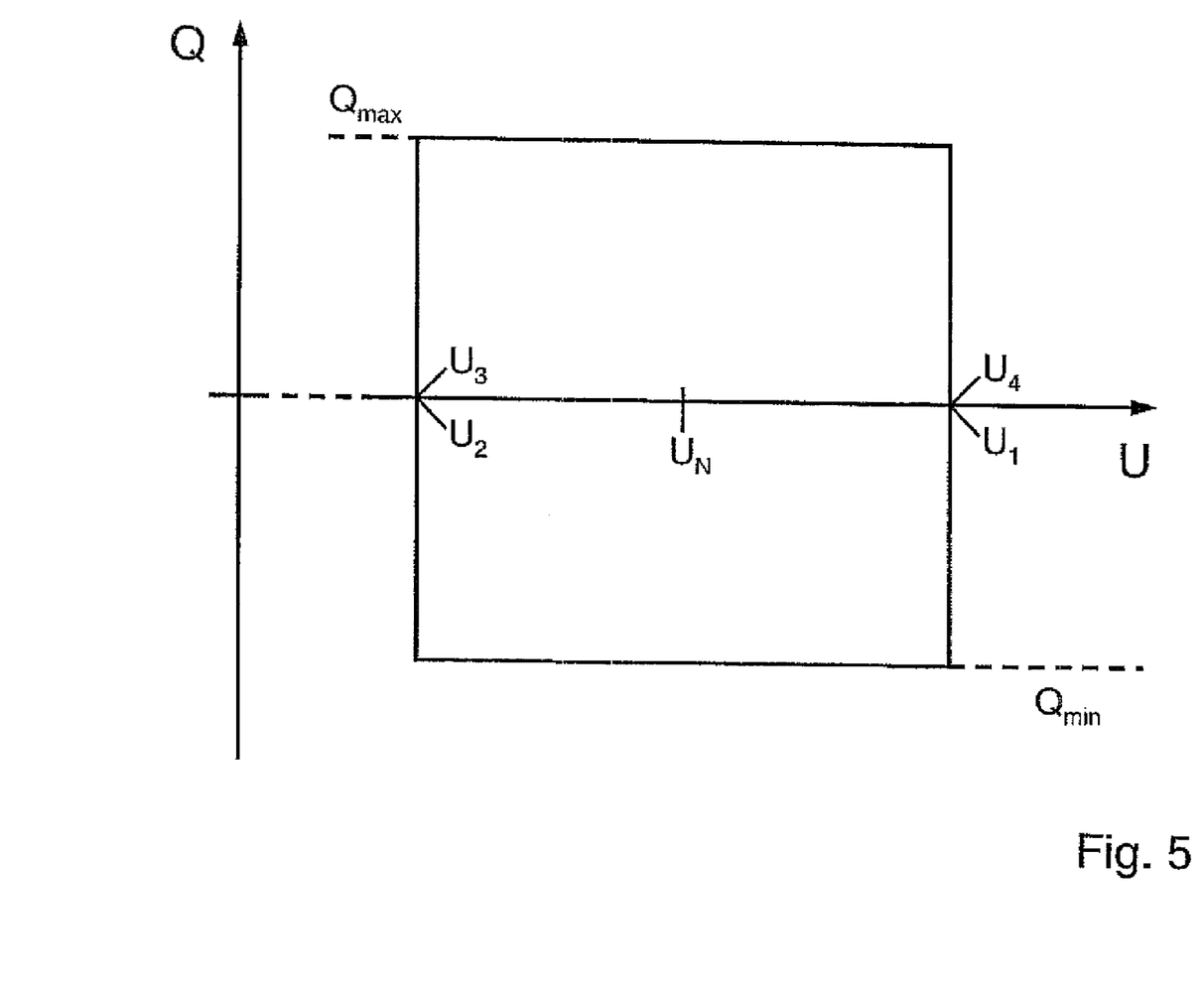

Further variants of the method are depicted in FIGS. 4 and 5. FIG. 4 shows a case in which the intervals between $U_2$ and $U_1$ or $U_3$ and $U_4$, respectively, partly overlap each other.

FIG. 5 shows the case that the two intervals overlap each other completely. In this, the desired value of the reactive power is kept constant in the whole interval between $U_3$ and $U_4$, and only when exceeding $U_1$ or falling below $U_3$, respectively, a change of the desired value of the reactive power sets on.

Thus, FIGS. 1, 2, 4 and 5 show different examples how an adaptation of the method to different conditions of location and grid is possible by changing the limit values for the voltage $U_1 \ldots U_4$. In daily practice, the method will be implemented in such a manner that the limit values $U_1 \ldots U_4$ can be changed in a simple way by changing operation parameters of the wind energy plant, or that the limit values are shifted corresponding to the desired value of the grid voltage $U_N$.

In the same manner, by changing the limit values for the reactive power, $Q_{min}$ and $Q_{max}$, a simple adaptation of the method is possible. For better exploitation of the technical capacity of the wind energy plant, it makes sense furthermore that the limit values $Q_{min}$ and $Q_{max}$ are matched to the momentary active power delivery and/or power reserve of the wind energy plant in the current operation. A suitable method is described in EP 1 508 951, the entire contents of which is incorporated herebin by reference, for instance.

Figure 6:
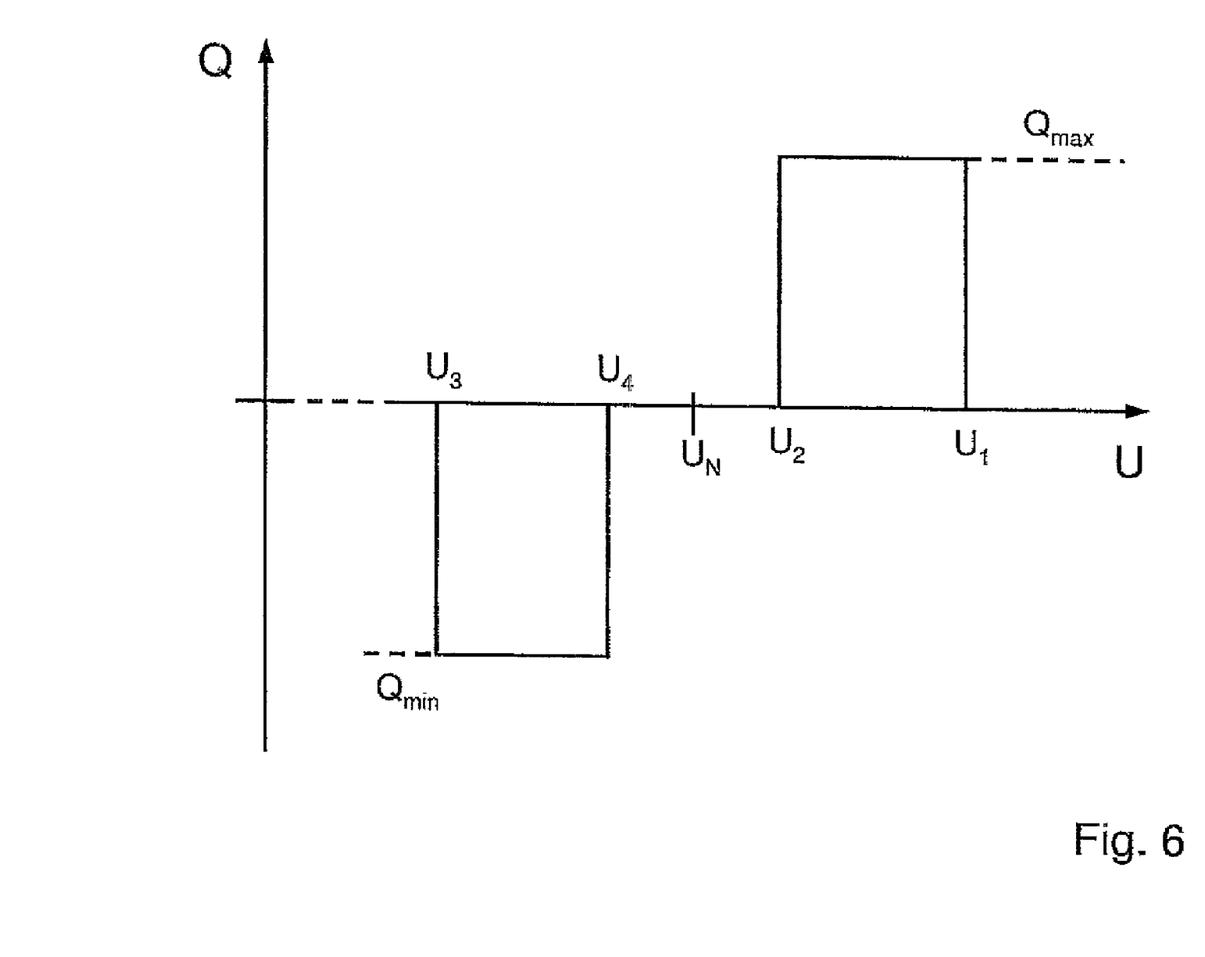
FIG. 6 shows a depiction of the determination of the desired value according to FIG. 1 with another choice of the algebraic signs.

FIG. 6 illustrates the method according to FIG. 1 for the case that the sign conventions are chosen otherwise, namely in the manner that reactive power above the abscissa acts voltage-lowering and reactive power below the abscissa acts voltage-increasing.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant in which a reactive electric variable (Q) reacts to voltage changes, the wind energy plant having a desired value of the grid voltage ($U_N$) and a real value of the grid voltage (U), comprising:
    defining a first upper limit value of the grid voltage ($U_1$) and/or a first lower limit value of the grid voltage ($U_3$);
    adjusting the reactive electric variable (Q) when the real value of the grid voltage (U) exceeds the first upper limit value of the grid voltage ($U_1$), and/or falls below the first lower limit value of the grid voltage ($U_3$) such that the deviation of the real value of the grid voltage (U) from the desired value of the grid voltage ($U_N$) is counteracted, characterised in that the desired value of the reactive electric variable (Q) is continuously increased or decreased further over time as long as the real value of the grid voltage (U) exceeds the first upper limit value of the grid voltage ($U_1$) or falls below the first lower limit value of the grid voltage ($U_3$).

2. The method according to claim 1, characterised in that the first upper limit value of the grid voltage ($U_1$) is greater than or equal to the desired value of the grid voltage ($U_N$).

3. The method according to claim 1, characterised in that the first lower limit value of the grid voltage ($U_3$) is smaller than or equal to the desired value of the grid voltage ($U_N$).

4. The method according to claim 1, characterised in that the desired value of the reactive electric variable (Q) is increased or decreased until the desired value of the reactive electric variable (Q) has reached a maximum value ($Q_{max}$) or a minimum value ($Q_{min}$).

5. The method according to claim 1, further comprising:
    defining a second lower limit value of the grid voltage ($U_2$), the second lower limit value of the grid voltage ($U_2$) being smaller or equal to the first upper limit value of the grid voltage ($U_1$);
    continuously increasing or decreasing the desired value for the reactive electric variable (Q) when the real value of the grid voltage (U) falls below the second lower limit value of the grid voltage ($U_2$) until a first predetermined desired value for the reactive electric variable has been reached.

6. The method according to claim 1, further comprising:
    defining a second upper limit value of the grid voltage ($U_4$), the second upper limit value of the grid voltage ($U_4$) being greater or equal to the first lower limit value of the grid voltage ($U_3$),
    continuously increasing or decreasing the desired value of the reactive electric variable (Q) when the real value of the grid voltage (U) exceeds the second upper limit value of the grid voltage ($U_4$) until a second predetermined desired value for the reactive electric variable has been reached.

7. The method according to claim 6, characterised in that the first predetermined desired value for the reactive electric variable is equal to the second predetermined desired value for the reactive electric variable.

8. The method according to claim 7, characterised in that the first and the second predetermined desired value for the reactive electric variable is zero.

9. The method according to claim 7, characterised in that the first and the second predetermined desired value for the reactive electric variable is different from zero.

10. The method according to claim 1, characterised in that when the real value of the grid voltage (U) falls below the first upper limit value of the grid voltage ($U_1$) again, and/or exceeds the first lower limit value of the grid voltage ($U_3$) again, the desired value for the reactive electric variable (Q) is set to a value which is constant over time.

11. The method according to claim 10, characterised in that the value which is constant over time for the reactive electric variable (Q) is equal to the actual desired value of the reactive electric variable when exceeding the first lower limit value of the grid voltage ($U_3$) again or falling below the first upper limit value of the grid voltage ($U_1$) again, respectively.

12. The method according to claim 5, characterised in that when the real value of the grid voltage (U) exceeds the second lower limit value of the grid voltage ($U_2$) again, and/or falls below the second upper limit value of the grid voltage ($U_4$) again, the desired value for the reactive electric variable is set to a value which is constant over time.

13. The method according to claim 12, characterised in that the value which is constant over time for the reactive electric variable is equal to the actual desired value of the reactive electric variable when exceeding the second lower limit value of the grid voltage ($U_2$) again or falling below the second upper limit value of the grid voltage ($U_4$) again, respectively.

14. The method according to claim 5, characterised in that the second lower limit value of the grid voltage ($U_2$) is greater or equal to the first lower limit value of the grid voltage ($U_3$).

15. A method according to claim 6, characterized in that the second upper limit value of the grid voltage ($U_4$) is smaller or equal to the first upper limit value of the grid voltage ($U_1$).

16. The method according to claim 1, characterised in that the reactive electric variable (Q) is a generated reactive power.

17. The method according to claim 1, characterised in that the reactive electric variable (Q) is a generated reactive current.

18. The method according to claim 1, characterised in that the reactive electric variable (Q) is the phase angle of a generated power.

19. The method according to claim 1, characterised in that the reactive electric variable (Q) is a power factor of a generated power.

20. The method according to claim 1, characterised in that the limit values of the grid voltage (U) are adjustable.

\* \* \* \* \*